(12) United States Patent
Imai et al.

(10) Patent No.: US 7,576,781 B2
(45) Date of Patent: Aug. 18, 2009

(54) IMAGE PROCESSING OF IMAGE DATA

(75) Inventors: Toshie Imai, Nagano-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 972 days.

(21) Appl. No.: 10/752,381

(22) Filed: Jan. 5, 2004

(65) Prior Publication Data

US 2004/0207730 A1    Oct. 21, 2004

(30) Foreign Application Priority Data

Jan. 8, 2003    (JP) .............................. 2003-001922

(51) Int. Cl.
*H04N 5/28* (2006.01)
*H04N 5/76* (2006.01)

(52) U.S. Cl. ............... 348/222.1; 348/231.3; 348/231.6

(58) Field of Classification Search ............. 348/222.1, 348/207.1, 231.3, 231.6
See application file for complete search history.

(56) References Cited

U.S. PATENT DOCUMENTS

| | | | | |
|---|---|---|---|---|
| 6,011,547 A | * | 1/2000 | Shiota et al. ................. | 382/254 |
| 2003/0035127 A1 | * | 2/2003 | Nakami ........................ | 358/1.9 |
| 2004/0141069 A1 | * | 7/2004 | Nakami ................... | 348/231.6 |

FOREIGN PATENT DOCUMENTS

JP    2000-165647    6/2000
JP    2001-186297    7/2001

OTHER PUBLICATIONS

Abstract of Japanese Patent Publication No. 2000-165647, Pub. Date: Jun. 16, 2000, Patent Abstracts of Japan.
Abstract of Japanese Patent Publication No. 2001-186297, Pub. Date: Jul. 6, 2001, Patent Abstracts of Japan.

* cited by examiner

*Primary Examiner*—Sinh N Tran
*Assistant Examiner*—Wanda M Negron
(74) *Attorney, Agent, or Firm*—Martine Penilla & Gencarella, LLP

(57) ABSTRACT

Image processing apparatus 10 analyzes image data to acquire picture quality characteristic values, and uses shooting information SI and image processing control information GI associated with the image data to define a scene correction condition and an arbitrary correction condition. The image processing apparatus 10 preferentially uses information from the image processing control information GI, while using [information] from the shooting information SI where this information is not present in the image processing control information GI, with the aim of effective mutual utilization of image processing control information GI and shooting information SI. The image processing apparatus 10 defines an automatic correction level AP on the basis of the acquired picture quality characteristic values, scene correction condition and arbitrary correction condition, and defines a manual correction level MP on the basis of a manual correction condition in the image processing control information GI. Utilizing the automatic correction level AP and manual correction level MP, the image processing apparatus 10 executes a picture quality adjustment process to correct the image data.

15 Claims, 9 Drawing Sheets

IMAGE PROCESSING OF IMAGE DATA

BACKGROUND OF THE INVENTION

1. Field of the Invention

The present invention relates to image processing technology employing shooting information at the time of shooting, and image processing control information that designates image processing conditions to be used when performing image processing on image data.

2. Description of Related Art

To date, there have been proposed techniques for performing image processing of image data created by an image data generating apparatus such as a digital still camera (DSC), which involve performing image processing with reference to shooting information (shooting conditions) at the time of shooting, and image processing control information that designates processing conditions to be used during image processing. Shooting information and image processing control information is typically described in the header of the image data, and is associated with a particular set of image data.

According to this image processing technique, where shooting information is used, it becomes possible to perform on image data image processing that is adapted to the shooting conditions, thus preventing image processing that is inappropriate for a particular type of photographed scene, for example. Where image processing control information is used, it becomes possible to perform on image data image processing based on certain image processing conditions contemplated at the time of shooting, so that output images reflect the photographer's intention or the DSC vendor's design.

With the prior art image processing apparatus, however, since the idea was to use either shooting information or image processing control information, if an image processing apparatus were designed to be capable of image processing using image processing control information, it could not utilize shooting information, even if such information were associated with the image data.

Also, in the event that a portion of one set of information cannot be used, if the other set of information includes information corresponding to the information that cannot be used, it will not be possible to use the aforementioned information. Accordingly, there is a need to perform image processing in an appropriate manner, that mutually utilizes, in an effective manner, shooting information and image processing control information.

SUMMARY OF THE INVENTION

The present invention is intended to address this need, and has as an object to provide image processing that reflects shooting conditions and the photographer's intention, by mutually utilizing shooting information and image processing control information.

In a first aspect for addressing the aforementioned problem, the invention provides a method for image processing of image data. The method pertaining to this first aspect comprising acquiring shooting information that indicates shooting conditions at the time of shooting, said information describing a plurality of shooting condition parameters; acquiring image processing control information that designates a plurality of picture quality adjustment parameters to be used during image processing, said information describing a plurality of specifying parameters; setting said plurality of picture quality adjustment parameters on the basis of said plurality of specifying parameters, while for any of said plurality of picture quality adjustment parameters that is not set by means of said specifying parameters, setting these said picture quality adjustment parameters on the basis of said shooting condition parameters; and executing image processing of said image data using said set picture quality adjustment parameters.

According to the image processing method which pertains to this first aspect, a plurality of picture quality adjustment parameters are set on the basis of a plurality of specifying parameters, or where a quality adjustment parameter is not set by means of a specifying parameter, a picture quality adjustment parameter set on the basis of shooting condition parameters is used instead, and image processing of image data is performed using picture quality adjustment parameter set thusly, whereby image processing can be carried out in such a way as to reflect, in the image output characteristics of an output apparatus, the shooting conditions and the photographer's intention, by mutually utilizing shooting information and image processing control information.

In the image processing method that pertains to the first aspect of the invention, said plurality of specifying parameters may include parameters that make up particular combinations of specifying parameters appropriate to particular shooting scenes, for designating image processing depending on the shooting scene; and said shooting condition parameters may include scene-specific shooting condition parameters describing a particular shooting scene set at the time of shooting. This makes it possible to set a plurality of parameters all at once on a shooting scene-by-scene basis, facilitating shooting scene-appropriate image processing on a shooting scene-by-scene basis.

In the image processing method that pertains to the first aspect of the invention, image processing of said image data may comprise analyzing said image data to extract characteristic parameters that indicate picture quality characteristics of image data; acquiring a plurality of standard parameters predetermined for said plurality of picture quality adjustment parameters and serving as targets in picture quality adjustment; and adjusting picture quality of said image data by eliminating or reducing any deviation between each value of said characteristic parameters and each value of said acquired standard picture quality parameters with reflecting said plurality of picture quality adjustment parameters. In addition to picture quality adjustment using shooting information or image processing control information, this arrangement enables to carry out picture quality adjustment adapted to the picture quality of each set of image data, whereby it is possible to perform more appropriate image processing on an image data-by-image data basis.

The first aspect of the present invention may also be embodied as an image processing method for executing image processing of image data. The image processing apparatus pertaining to the first aspect of the invention comprises shooting information acquisition logic for acquiring shooting information that indicates shooting conditions at the time of shooting, said information describing a plurality of shooting condition parameters; image processing control information acquisition logic for acquiring image processing control information that designates a plurality of picture quality adjustment parameters to be used during image processing, said information describing a plurality of specifying parameters; picture quality adjustment parameter setting logic for setting said plurality of picture quality adjustment parameters on the basis of said plurality of specifying parameters, while for any of said plurality of picture quality adjustment parameters that is not set by means of said specifying parameters, setting these said picture quality adjustment parameters on the basis of said shooting condition parameters; and image processing logic for executing image processing of said image data using said set picture quality adjustment parameters.

The image processing apparatus pertaining to the first aspect of the invention has similar functions and effects to those of the image processing method pertaining to the first aspect of the invention and has various arrangements as discussed above with regard to the image processing method pertaining to the first aspect of the invention.

The first aspect of the present invention may also be embodied as a computer program product having stored thereon image processing program instructions for executing image processing of image data. The computer program product pertaining to the first aspect of the invention comprises a program instruction for acquiring shooting information that indicates shooting conditions at the time of shooting, said information describing a plurality of shooting condition parameters; a program instruction for acquiring image processing control information that designates a plurality of picture quality adjustment parameters to be used during image processing, said information describing a plurality of specifying parameters; a program instruction for setting said plurality of picture quality adjustment parameters on the basis of said plurality of specifying parameters, while for any of said plurality of picture quality adjustment parameters that is not set by means of said specifying parameters, setting these said picture quality adjustment parameters on the basis of said shooting condition parameters; and a program instruction for executing image processing of said image data using said set picture quality adjustment parameters.

The computer program product pertaining to the first aspect of the invention has similar functions and effects to those of the image processing method pertaining to the first aspect of the invention and has various arrangements as discussed above with regard to the image processing method pertaining to the first aspect of the invention.

The invention in a second aspect thereof provides a method for image processing of image data that has been associated with at least one set of information selected from shooting information indicating shooting conditions at the time of shooting, and image processing control information designating a plurality of picture quality adjustment parameters to be used during image processing. The method pertaining to the second aspect of the invention comprises acquiring said image data; searching, from among the image processing conditions associated with said image data, for a scene-specific shooting condition parameter depending on a particular shooting scene; in the event that a said scene-specific shooting condition parameter is not found, searching, from among the shooting conditions associated with said image data, for a shooting scene condition; searching, from among the image processing conditions associated with said image data, for an arbitrary image processing designating condition that arbitrarily designates an image processing condition; in the event that a said arbitrary image processing designating condition is not found, searching, from among the shooting conditions associated with said image data, for an arbitrarily set shooting condition; and acquiring each said searched for condition, and executing image processing of said image data using said acquired conditions.

According to the image processing method that pertains to the second aspect of the invention, image processing conditions associated with a set of image data are searched for a scene-specific shooting condition parameter depending on the shooting scene; in the event that a said scene-specific shooting condition parameter is not found, shooting conditions associated with the image data are searched for a shooting scene condition; the image processing conditions associated with the image data are searched for an arbitrary image processing designating condition that arbitrarily designates an image processing condition; in the event that an arbitrary image processing designating condition is not found, the shooting conditions associated with said image data are searched for an arbitrarily set shooting condition; and the conditions acquired through the searches are used to execute image processing of the image data, whereby image processing can be carried out in such a way as to reflect, in the image output characteristics of an output device, the shooting conditions and the photographer's intention, by mutually utilizing shooting information and image processing control information.

In the image processing method pertaining to the second aspect of the invention, image processing of image data may comprise analyzing said image data to extract characteristic parameters that indicate picture quality characteristics of image data; acquiring a plurality of standard parameters serving as targets in picture quality adjustment; and adjusting picture quality of said image data by eliminating or reducing any deviation between each value of said characteristic parameters and each value of said acquired standard picture quality parameters with reflecting said plurality acquired.

In addition to picture quality adjustment using shooting information or image processing control information, this arrangement enables to carry out picture quality adjustment adapted to the picture quality of each set of image data, whereby it is possible to perform more appropriate image processing on an image data-by-image data basis.

The second aspect of the invention may also be embodied as an image processing apparatus for executing image processing of image data that has been associated with at least one set of information selected from shooting information indicating shooting conditions at the time of shooting, and image processing control information designating a plurality of picture quality adjustment parameters to be used during image processing. The image processing apparatus pertaining to the second aspect of the invention comprises image data acquisition logic for acquiring said image data; first search logic for searching, from among the image processing conditions associated with said image data, for a scene-specific shooting condition parameter depending on a particular shooting scene, and in the event that a said scene-specific shooting condition parameter is not found, searching, from among the shooting conditions associated with said image data, for a shooting scene condition; second search logic for searching, from among the image processing conditions associated with said image data, for an arbitrary image processing designating condition that arbitrarily designates an image processing condition, and in the event that a said arbitrary image processing designating condition is not found, searching, from among the shooting conditions associated with said image data, for an arbitrarily set shooting condition; and image processing logic for executing image processing of said image data using conditions acquired by each said search logic.

The image processing apparatus pertaining to the second aspect of the invention has similar functions and effects to those of the image processing method pertaining to the second aspect of the invention and has various arrangements as discussed above with regard to the image processing method pertaining to the second aspect of the invention.

The second aspect of the present invention may also be embodied as a computer program product having stored thereon image processing program instructions for executing image processing of image data that has been associated with at least one set of information selected from shooting information indicating shooting conditions at the time of shooting, and image processing control information designating a plurality of picture quality adjustment parameters to be used during image processing. The computer program product pertaining to the second aspect of the invention comprises a program instruction for acquiring said image data; a program instruction for searching, from among the image processing conditions associated with said image data, for a scene-specific shooting condition parameter depending on a particular shooting scene; a program instruction that, in the event that a said scene-specific shooting condition parameter is not found, searches, from among the shooting conditions associated with said image data, for a shooting scene condition; a program instruction for searching, from among the image processing conditions associated with said image data, for an arbitrary image processing designating condition that arbitrarily designates an image processing condition; a program instruction that, in the event that a said arbitrary image processing designating condition is not found, searches, from among the shooting conditions associated with said image data, for an arbitrarily set shooting condition; and a program instruction for acquiring each said searched for condition, and executing image processing of said image data using said acquired conditions.

The computer program product pertaining to the second aspect of the invention has similar functions and effects to those of the image processing method pertaining to the second aspect of the invention and has various arrangements as discussed above with regard to the image processing method pertaining to the second aspect of the invention.

The invention in a third aspect thereof provides a method for image processing of image data that has been associated with at least one set of information selected from shooting information indicating shooting conditions at the time of shooting, and image processing control information designating a plurality of picture quality adjustment parameters to be used during image processing. The method pertaining to the third aspect of the invention comprises acquiring shooting scene information from said shooting conditions; defining scene correction information on the basis of said acquired shooting scene information; searching among said image processing conditions for a scene-specific image processing condition that designates an image processing condition on a scene-specific basis; in the event that said scene-specific image processing condition is found among said image processing conditions, replacing said scene correction information with said scene-specific image processing condition; acquiring arbitrary correction information from said shooting conditions; defining image arbitrary correction information on the basis of the acquired said arbitrary correction information; searching among said image processing conditions for an arbitrary image processing condition designating an arbitrarily selected image processing condition; in the event that a said arbitrary image processing condition is found among said image processing conditions, and executing image processing of said image data on the basis of said scene correction condition and said image arbitrary correction information.

According to the image processing method which pertains to the third aspect of the invention, scene correction information and image arbitrary correction information are acquired from shooting information and image processing control information, and image processing of image data is performed on the basis of both types of correction information, whereby image processing can be carried out in such a way as to reflect, in the image output characteristics of an output device, the shooting conditions and the photographer's intention, by mutually utilizing shooting information and image processing control information.

In the image processing method which pertains to the third aspect of the invention, image processing of image data may comprise analyzing said image data to extract characteristic parameters that indicate picture quality characteristics of image data; acquiring a plurality of standard parameters serving as targets in picture quality adjustment; and adjusting picture quality of said image data by eliminating or reducing any deviation between each value of said characteristic parameters and each value of said acquired standard picture quality parameters with reflecting said scene correction condition and said image arbitrary correction information. In addition to picture quality adjustment using shooting information or image processing control information, this arrangement enables to carry out picture quality adjustment adapted to the picture quality of each set of image data, whereby it is possible to perform more appropriate image processing on an image data-by-image data basis.

The third aspect of the invention may also be embodied as an image processing apparatus for executing image processing of image data that has been associated with at least one set of information selected from shooting information indicating shooting conditions at the time of shooting, and image processing control information designating a plurality of picture quality adjustment parameters to be used during image processing. The image processing apparatus pertaining to the third aspect of the invention comprises scene information acquisition logic for acquiring shooting scene information from said shooting conditions, and defining scene correction information; first search logic for searching among said image processing conditions for a scene-specific image processing condition that designates an image processing condition on a scene-specific basis; scene correction information update logic that, in the event that a said scene-specific image processing condition is found among said image processing conditions, replaces said scene correction information with said scene-specific image processing condition; arbitrary correction information acquisition logic for acquiring arbitrary correction information from said shooting conditions, and defining image arbitrary correction information; second search logic for searching among said image processing conditions for an arbitrary image processing condition designating an arbitrarily selected image processing condition; image arbitrary correction information update logic that, in the event that a said arbitrary image processing condition is found among said image processing conditions, replaces said image arbitrary correction information with said arbitrary image processing condition; and picture quality adjustment logic for executing image processing of said image data on the basis of said scene correction condition and said image arbitrary correction information.

The image processing apparatus pertaining to the third aspect of the invention has similar functions and effects to those of the image processing method pertaining to the third aspect of the invention and has various arrangements as discussed above with regard to the image processing method pertaining to the third aspect of the invention.

The third aspect of the present invention may also be embodied as a computer program product having stored thereon image processing program instructions for executing image processing of image data that has been associated with at least one set of information selected from shooting information indicating shooting conditions at the time of shooting, and image processing control information designating a plurality of picture quality adjustment parameters to be used during image processing. The computer program product pertaining to the third aspect of the invention comprises a program instruction for acquiring shooting scene information from said shooting conditions; a program instruction for defining scene correction information on the basis of said acquired shooting scene information; a program instruction for searching among said image processing conditions for a scene-specific image processing condition that designates an image processing condition on a scene-specific basis; a program instruction that, in the event that said scene-specific image processing condition is found among said image processing conditions, replaces said scene correction information with said scene-specific image processing condition; a program instruction for acquiring arbitrary correction information from said shooting conditions; a program instruction for defining image arbitrary correction information on the basis of the acquired said arbitrary correction information; a program instruction for searching among said image processing conditions for an arbitrary image processing condition designating an arbitrarily selected image processing condition; a program instruction that, in the event that a said arbitrary image processing condition is found among said image processing conditions, replaces said image arbitrary correction information with said arbitrary image processing condition; and a program instruction for executing image processing of said image data on the basis of said scene correction condition and said image arbitrary correction information.

The computer program product pertaining to the third aspect of the invention has similar functions and effects to those of the image processing method pertaining to the third aspect of the invention and has various arrangements as discussed above with regard to the image processing method pertaining to the third aspect of the invention.

The invention in a fourth aspect thereof provides a method for image processing of image data that has been associated with at least one set of information selected from shooting information that indicates shooting conditions at the time of shooting, and image processing control information that designates a plurality of picture quality adjustment parameters to be used during image processing. The image processing method pertaining to the fourth aspect of the invention comprises selecting either said shooting information or said image processing control information; acquiring as information either said selected shooting information or said image processing control information; and executing picture quality adjustment processing of said image data using said acquired information.

According to the image processing method which pertains to the fourth aspect of the invention, either selected shooting information or image processing control information is acquired, and image processing of the image data is performed using the acquired information, whereby image processing can be carried out in such a way as to reflect the shooting conditions and the photographer's intention, by mutually utilizing shooting information and image processing control information.

The image processing method pertaining to the fourth aspect of the invention can also be embodied as a image processing apparatus, or computer program product having stored thereon image processing program instructions.

DETAILED DESCRIPTION OF THE PREFERRED EMBODIMENTS

A fuller understanding of the image processing apparatus pertaining to the invention is provided through the following description of an embodiment, making reference to the accompanying drawings.

Figure 1:
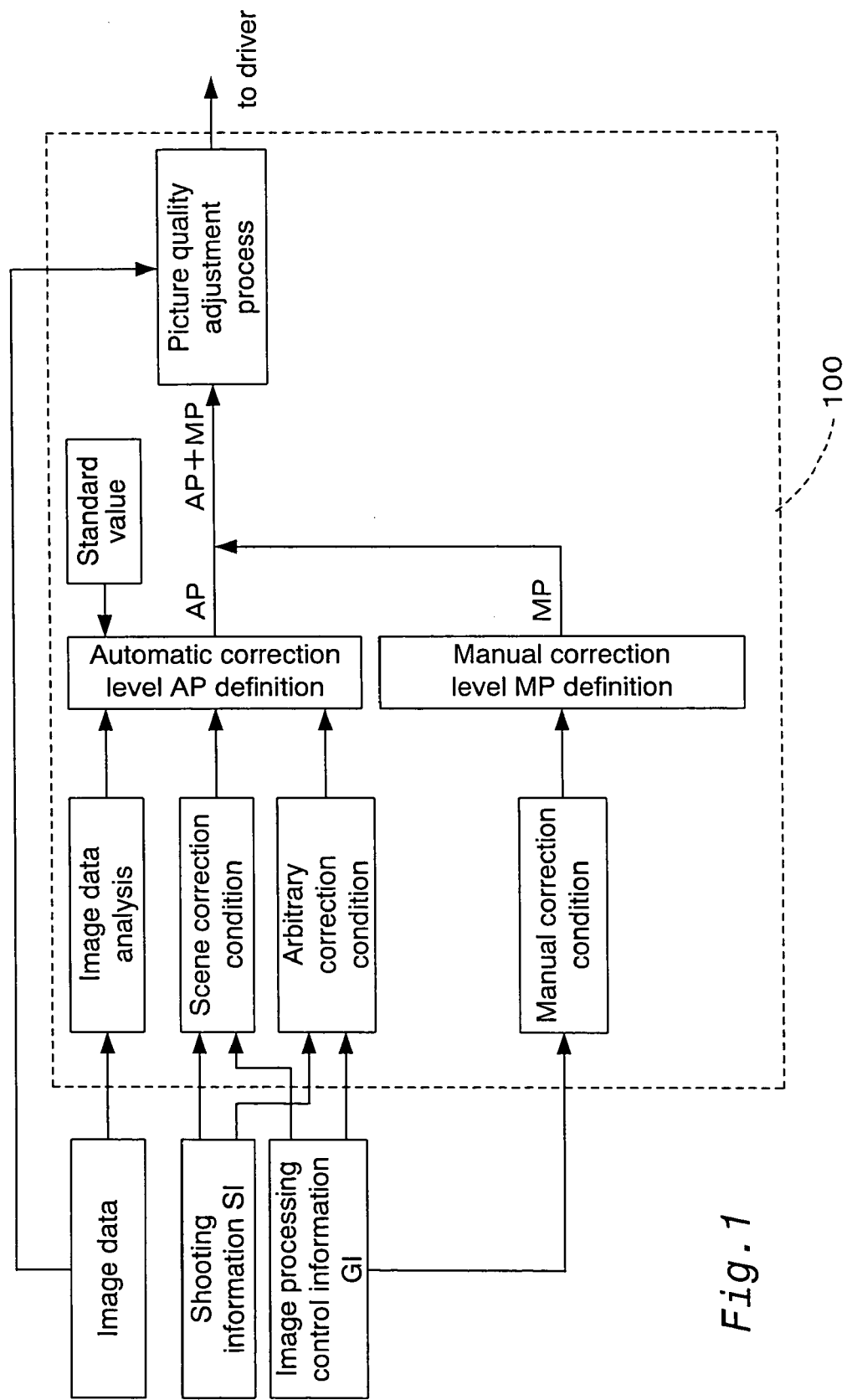
FIG. 1 shows the features of image processing executed in the image processing apparatus pertaining to an embodiment.

The following description of the features of the image processing apparatus pertaining to the embodiment makes reference to FIG. 1. FIG. 1 is an illustration showing the features of image processing executed in the image processing apparatus pertaining to the embodiment.

In the image processing apparatus pertaining to the embodiment, image processing is carried out through mutual effective use of shooting information SI, which is associated with image data generated by a digital still camera (DSC) and describes shooting conditions at the time of shooting, and image processing control information GI that designates image processing conditions for the image data. The parameters included in shooting information SI and image processing control information GI will be described later; however, let it be noted here that shooting information SI describes the shooting conditions of shutter speed, exposure, and selected shooting scene at the time of shooting. Image processing control information GI, on the other hand, describes information that designates image processing conditions when performing image processing of image data, such as the image processing conditions of image processing conditions for a particular shooting scene, and working color space, for example.

When image data is input to image processing apparatus 10, the image data is analyzed to derive a picture quality characteristic value (statistical value), for example a histogram, indicating a particular picture quality. Using the shooting information SI and image processing control information GI corresponding to the image data input to it, image processing apparatus 10 defines a scene correction condition and an arbitrary correction condition. When defining the scene correction condition and arbitrary correction condition, the image processing apparatus first searches the shooting information SI for a description of a parameter relating to the scene correction condition, and in the event that it finds a parameter relating to the scene correction condition, adopts on a temporary basis the value of parameter resulting from the search as the scene correction condition. The image processing apparatus 10 then searches the image processing control information GI for a description of a parameter designating the scene correction condition, and in the event that it finds a parameter relating to the scene correction condition, the previously adopted scene correction condition is overwritten (updated) with the value of the parameter resulting from the search, which is defined as the final scene correction condition.

The image processing apparatus 10 then first searches the shooting information SI for a description of a parameter relating to the arbitrary correction condition, and in the event that it finds a parameter relating to the scene correction condition, adopts on a temporary basis the value of parameter resulting from the search as the arbitrary correction condition. The image processing apparatus 10 then searches the image processing control information GI for a description of a parameter designating the arbitrary correction condition, and in the event that it finds a parameter relating to the arbitrary correction condition, the previously adopted arbitrary correction condition is overwritten (updated) with the value of the parameter resulting from the search, which is selected as the final arbitrary correction condition. That is, with the image processing apparatus 10 pertaining to the embodiment, while preference is given to using parameter values (information) described in the image processing control information GI, for values of parameters that cannot be adopted from image processing control information GI, from shooting information SI are adopted instead, with the aim of effective mutual utilization of both image processing control information GI and shooting information SI.

On the basis of the acquired picture quality characteristic value, the scene correction condition, and the arbitrary correction condition, image processing apparatus 10 defines an automatic correction level (correction value) AP. The image processing apparatus also searches the image processing control information GI for a manual correction condition included therein, and defines a manual correction level (correction value) MP. An automatic correction level AP is a correction level defined using the three parameters of picture quality characteristic value, scene correction condition, and arbitrary correction condition, plus standard values which are target values for picture quality adjustment, that have been predetermined for each parameter; the picture quality adjustment process using the defined correction level is typically termed an automatic picture quality adjustment or automatic correction process. That is, in an automatic picture quality adjustment process, a correction level is defined so as to reduce or eliminate any deviation (difference) between parameters relating to a certain picture quality, for example, an acquired picture quality characteristic value for contrast and the predetermined standard value for contrast; in the embodiment, the extent of this elimination/reduction is determined more appropriately on the basis of the three parameters of picture quality characteristic value, scene correction condition, and arbitrary correction condition, to define an automatic correction level AP. A manual correction level MP, on the other hand, differs in that the value of a parameter relating to a picture quality described in the image processing control information GI is used as-is as the manual correction level MP.

Using the defined automatic correction levels AP and manual correction levels MP, image processing apparatus 10 performs picture quality adjustment process to correct the values of the parameters of the image data, and outputs the processed image data to drivers for various output devices. Foregoing logics are implemented by CPU 100 alone, or together with ROM 101, HDD 102, and RAM 103. Following is a more detailed description of image processing executed in the image processing apparatus pertaining to the embodiment.

Figure 2:
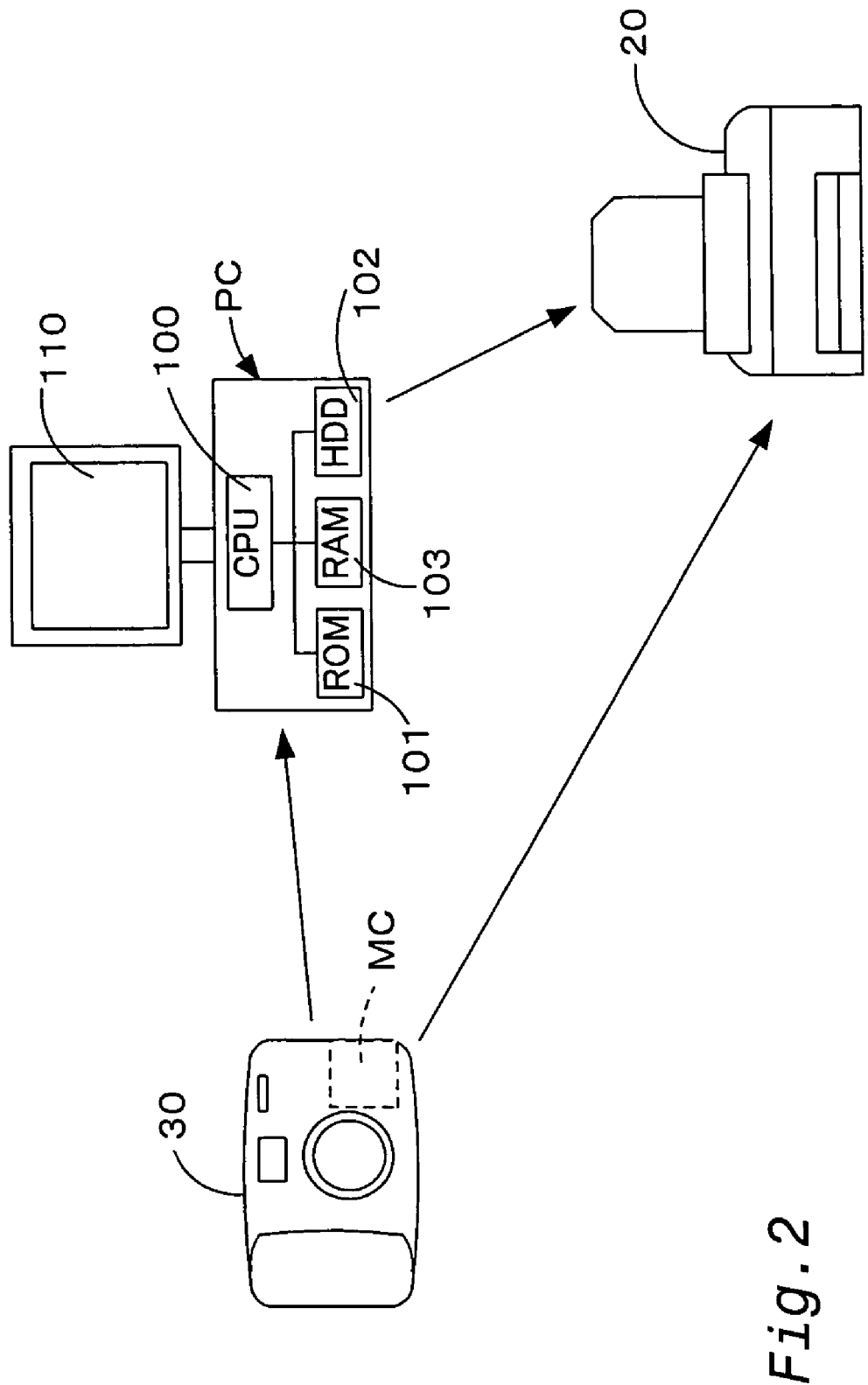
FIG. 2 shows a simplified illustration of a image processing system that includes the image processing apparatus pertaining to the embodiment.

The following description of a image processing system that includes the image processing apparatus pertaining to the embodiment makes reference to FIG. 2.

FIG. 2 is a simplified illustration of a image processing system that includes the image processing apparatus pertaining to the embodiment.

In the embodiment, the image processing apparatus is embodied as a personal computer PC. Personal computer PC comprises a central processing unit (CPU) 100 for executing various image processing operations, including a noise reduction process; read-only memory (ROM) 101 and a hard disk (HDD) 102 having stored therein a reference table, a program for executing image processing using shooting information SI and image processing control information GI, and the like; and random access memory (RAM) 103 for temporary storage of various kinds of input data, such as image data. CPU 100 alone, or together with ROM 101, HDD 102, and RAM 103, constitutes a given logic.

Personal computer PC additionally comprises an input interface for exchanging data and control signals with peripheral input devices; and an output interface for exchanging data and control signals with peripheral output devices. "Interface" herein refers both to a connector terminal (i.e., the hardware aspect) for connecting a peripheral device, and to the process of converting a signal (i.e., the software aspect) from a peripheral device.

In the embodiment, personal computer PC has a display device 110 and a printer 20 connected to it as peripheral devices. Image data reflecting the results of image processing is sent in real time to display device 110, which displays the output image. Image data for printing, which has been subjected to image processing and converted to data for printing, is sent to printer 20, which prints the output image.

As a peripheral input device, a photographic device, namely, a digital still camera (DSC) 30 is connected. DSC 30 is a photographic device that uses photoelectric converter elements, such as a CCD, to generate image data; it converts light information (energy) into electrical information (energy) by focusing an image of a subject on the CCD through an optical lens. When generating image data, DSC 30 writes into the header of the image data shooting information SI that describes shooting conditions set at the time of shooting, and image processing control information GI which is pre-stored in memory (e.g. in ROM) in the DSC 30; it then stores the image data on a memory card MC or the like. Image data generated by DSC 30 can also be input to personal computer PC via the memory card MC.

Figure 3:
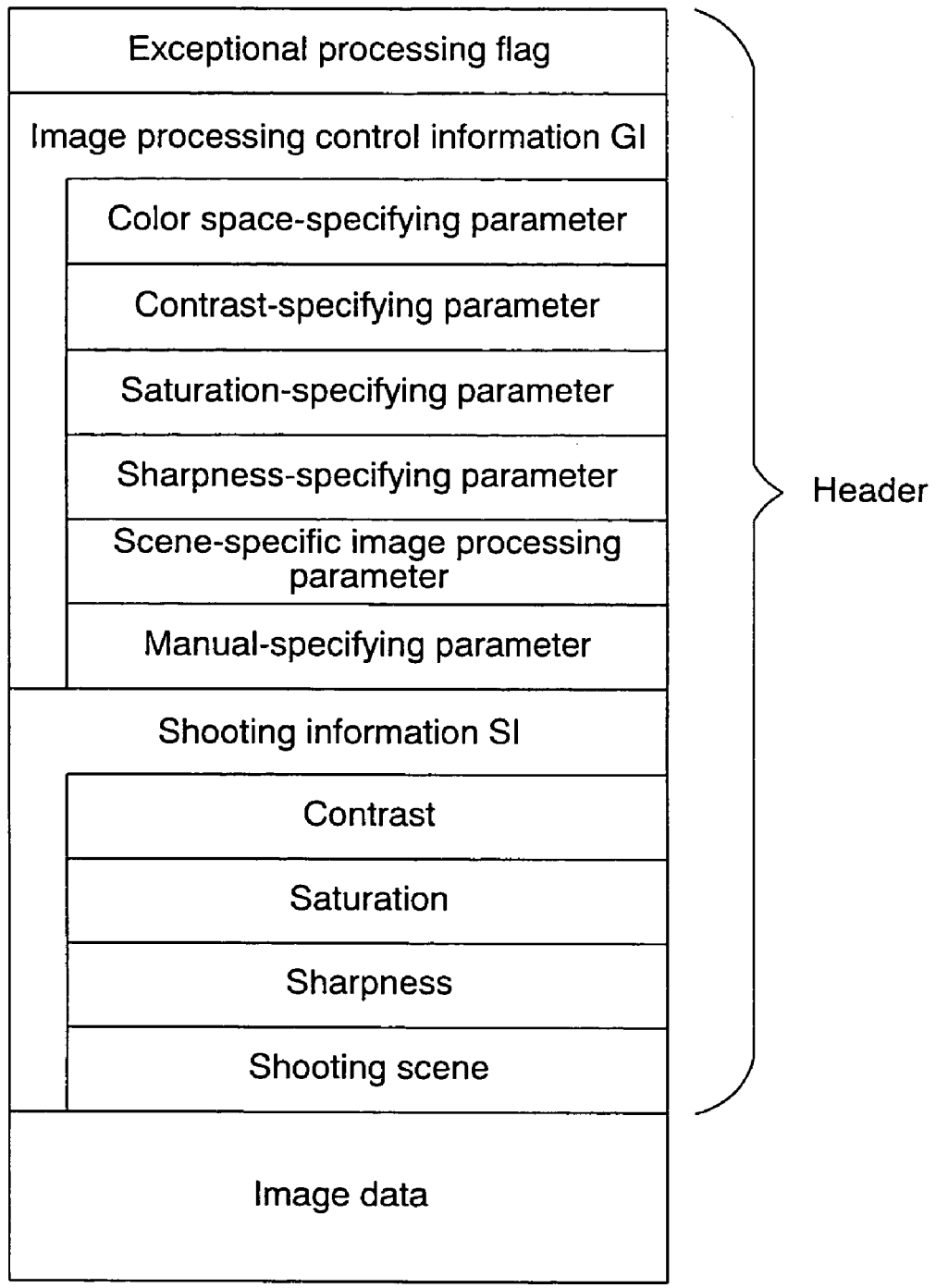
FIG. 3 shows examples of parameters described as shooting information SI and image processing control information GI.

Examples of parameters described by way of the shooting information SI and image processing control information GI are as shown in FIG. 3. FIG. 3 is an illustration showing examples of parameters described as shooting information SI and image processing control information GI. Parameters described by way of shooting information SI may include, for example, the parameters of contrast, saturation, sharpness, and shooting scene, which indicates one of four shooting scenes, namely, Standard, Night Scene, Landscape and Portrait. Shooting information SI consists of a description of settings for these parameters at the time of shooting. Parameters described by way of image processing control information GI, on the other hand, may include, for example, the parameters of working color space (NTSC, wRGB); a contrast-specifying parameter; a saturation-specifying parameter; a scene-specific image processing parameter specifying one of seven shooting modes, namely, Standard, Night Scene, Landscape, Portrait, Sports, Sunset, Fall Foliage; and a Manual [mode?] -specifying parameter. Image processing control information GI is information that has been derived experimentally in advance, as giving the desired output result when image data generated by any image data generating device, such as a DSC, is output as an image by a predetermined output device; it describes values for specifying parameters, calculated in advance for DSC/output device combinations.

While the embodiment describes a digital still camera 30 as the peripheral input device serving as a photographic device, a scanner, digital video camera, or the like could be used instead. Other peripheral input devices include a keyboard, mouse, or the like.

Figure 4:
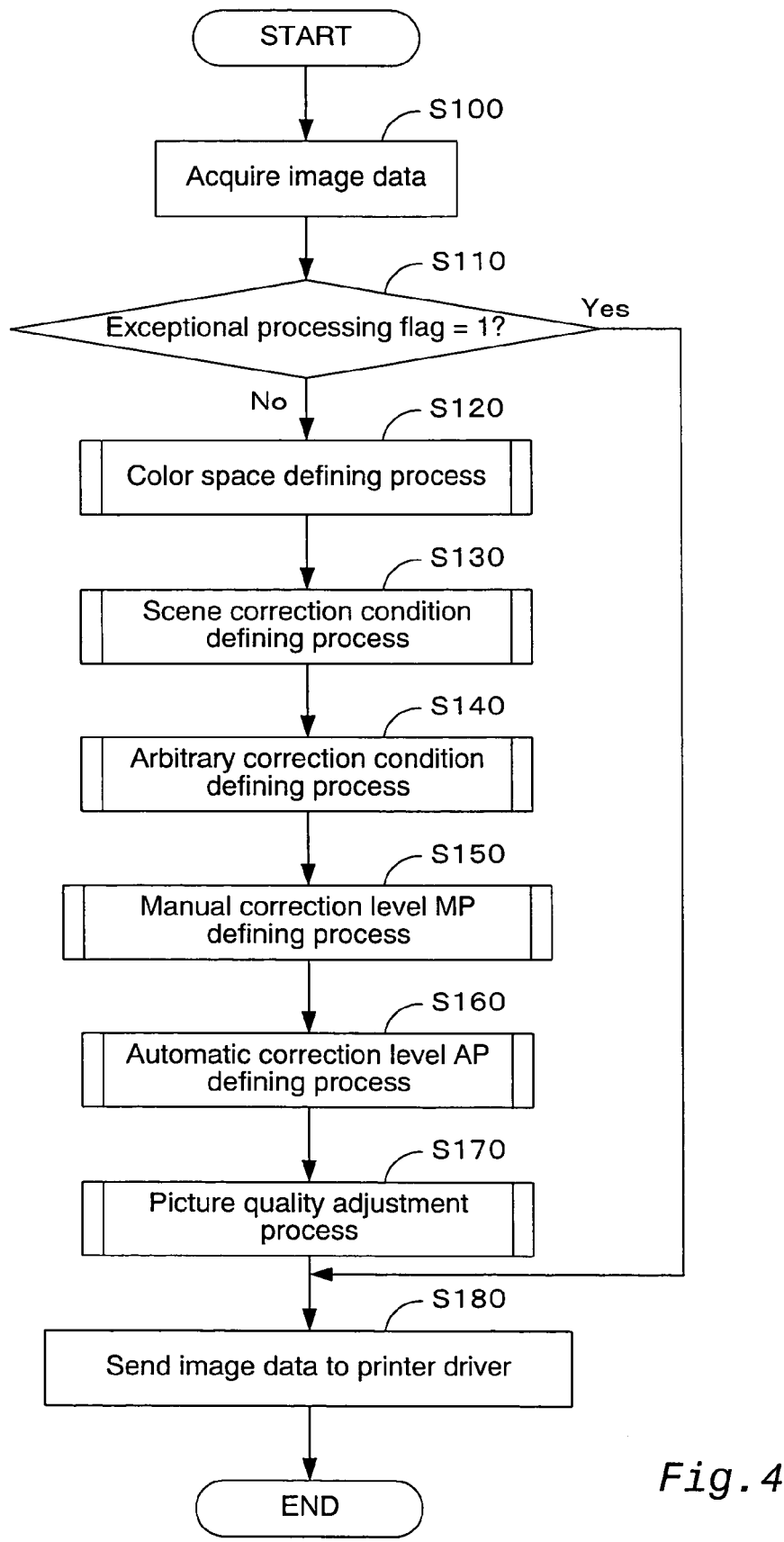
FIG. 4 is a flowchart showing the process routine of image processing executed by thee image processing apparatus of the embodiment.
Figure 5:
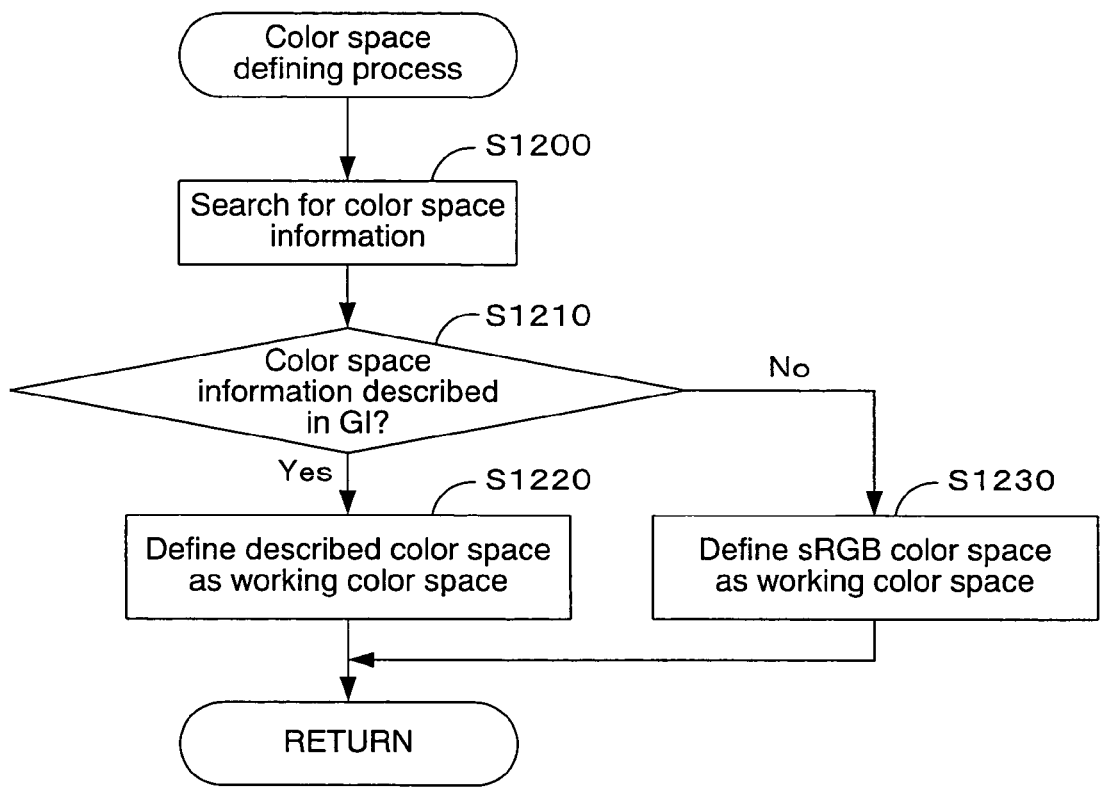
FIG. 5 is a flowchart showing the process routine for the color space setting process executed in the flowchart of FIG. 4.
Figure 6:
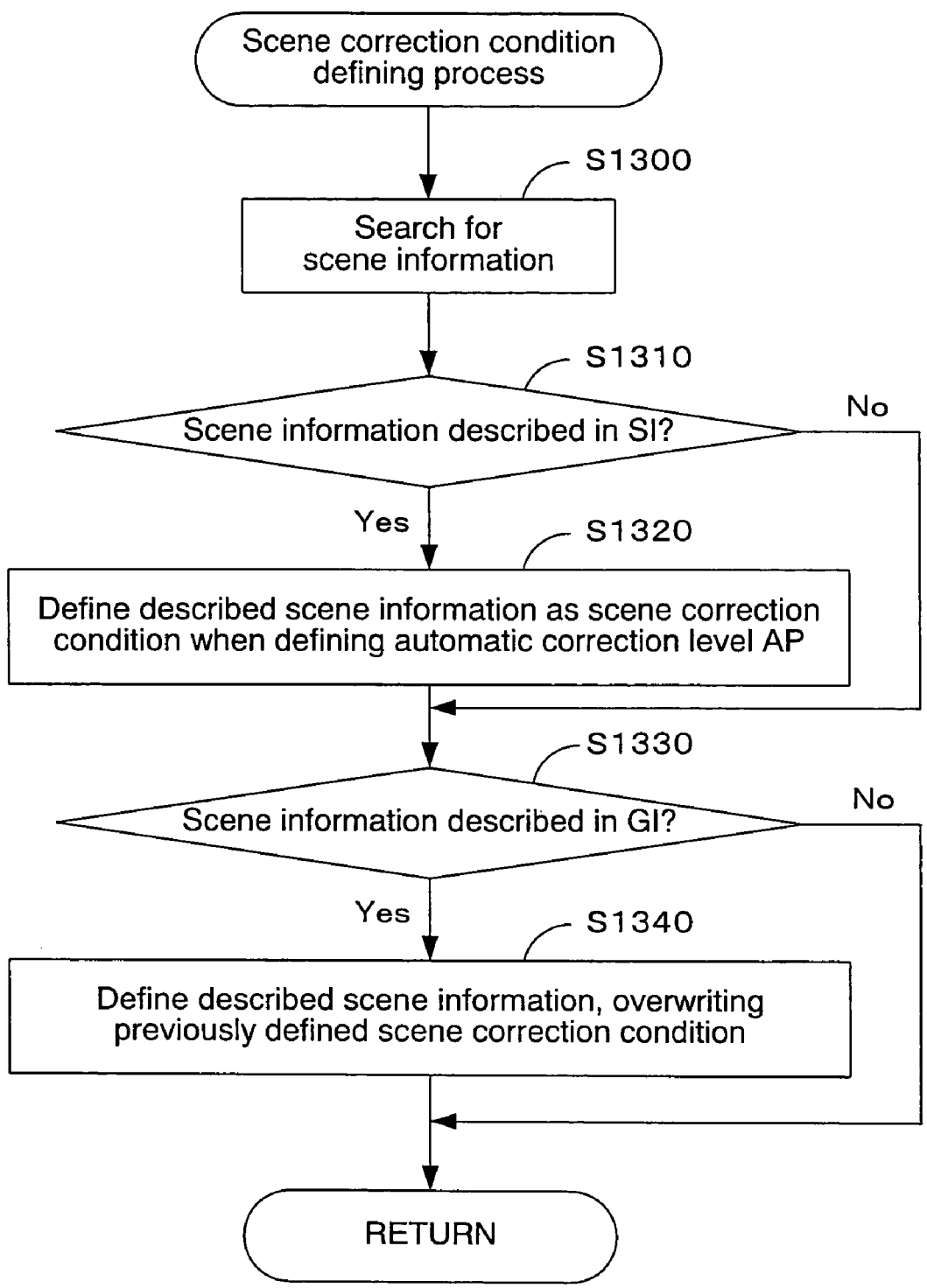
FIG. 6 is a flowchart showing the process routine for the scene correction condition setting process executed in the flowchart of FIG. 4.
Figure 7:
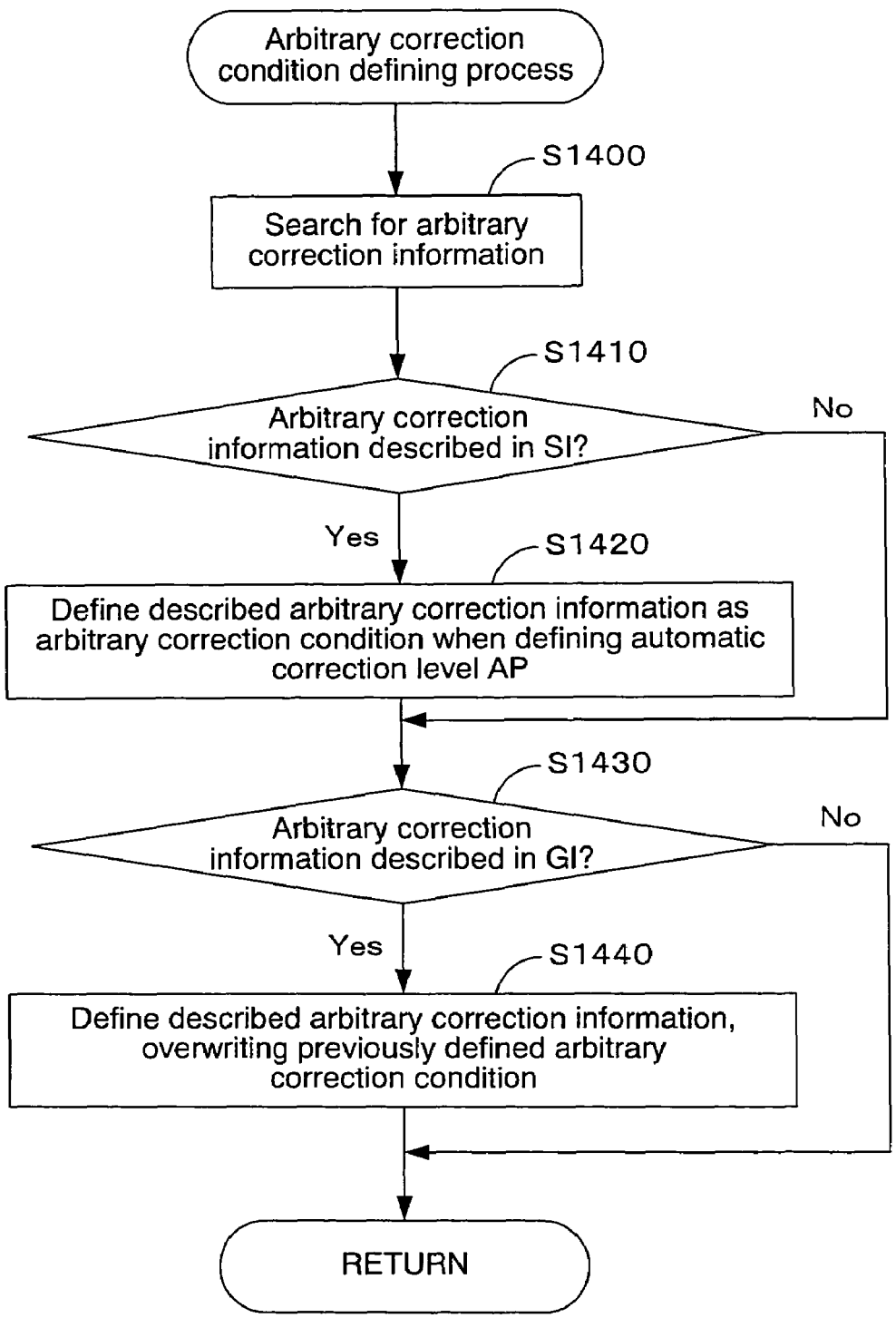
FIG. 7 is a flowchart showing the process routine for the arbitrary correction condition setting process executed in the flowchart of FIG. 4.
Figure 8:
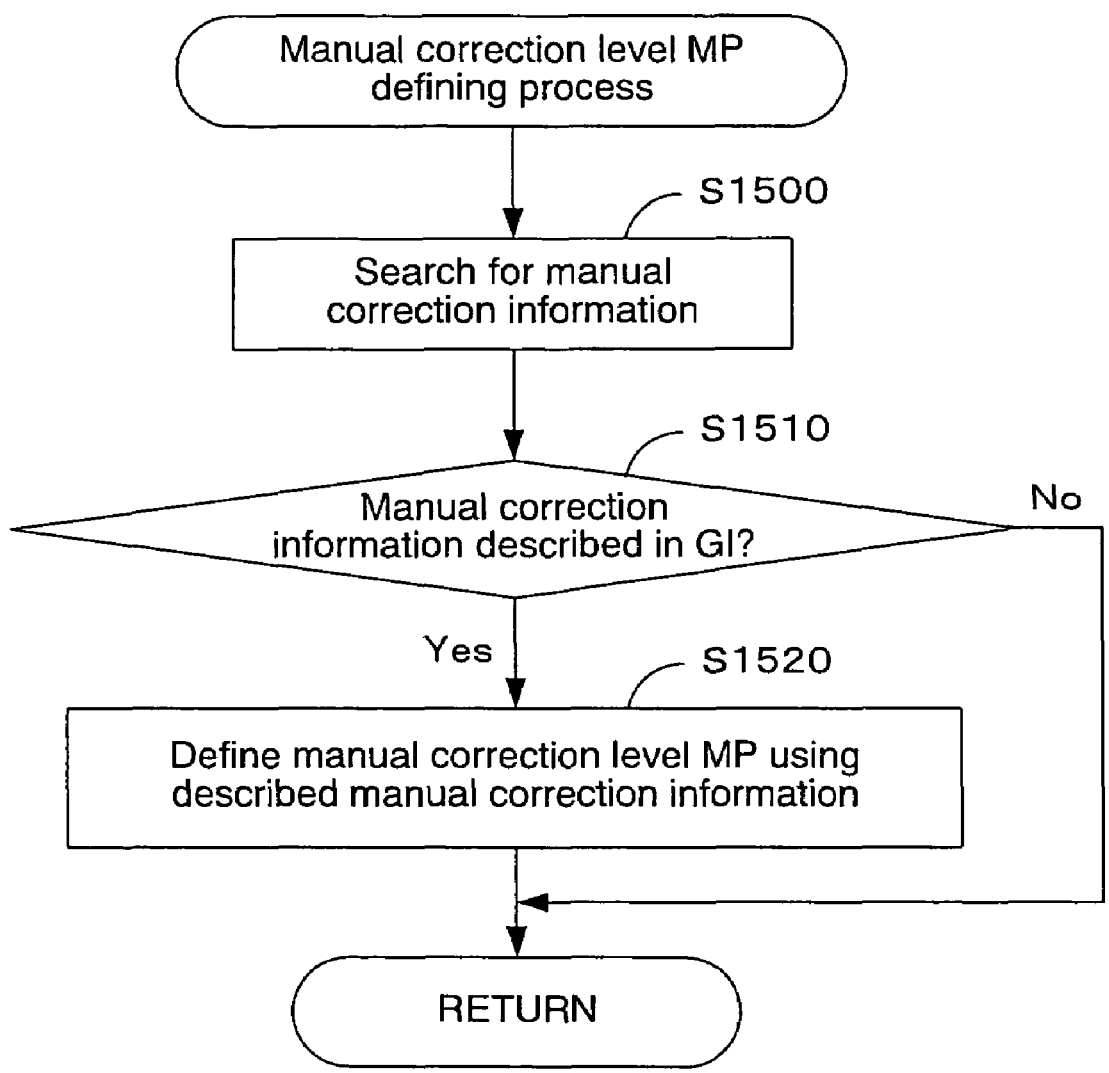
FIG. 8 is a flowchart showing the process routine for the manual correction condition setting process executed in the flowchart of FIG. 4.
Figure 9:
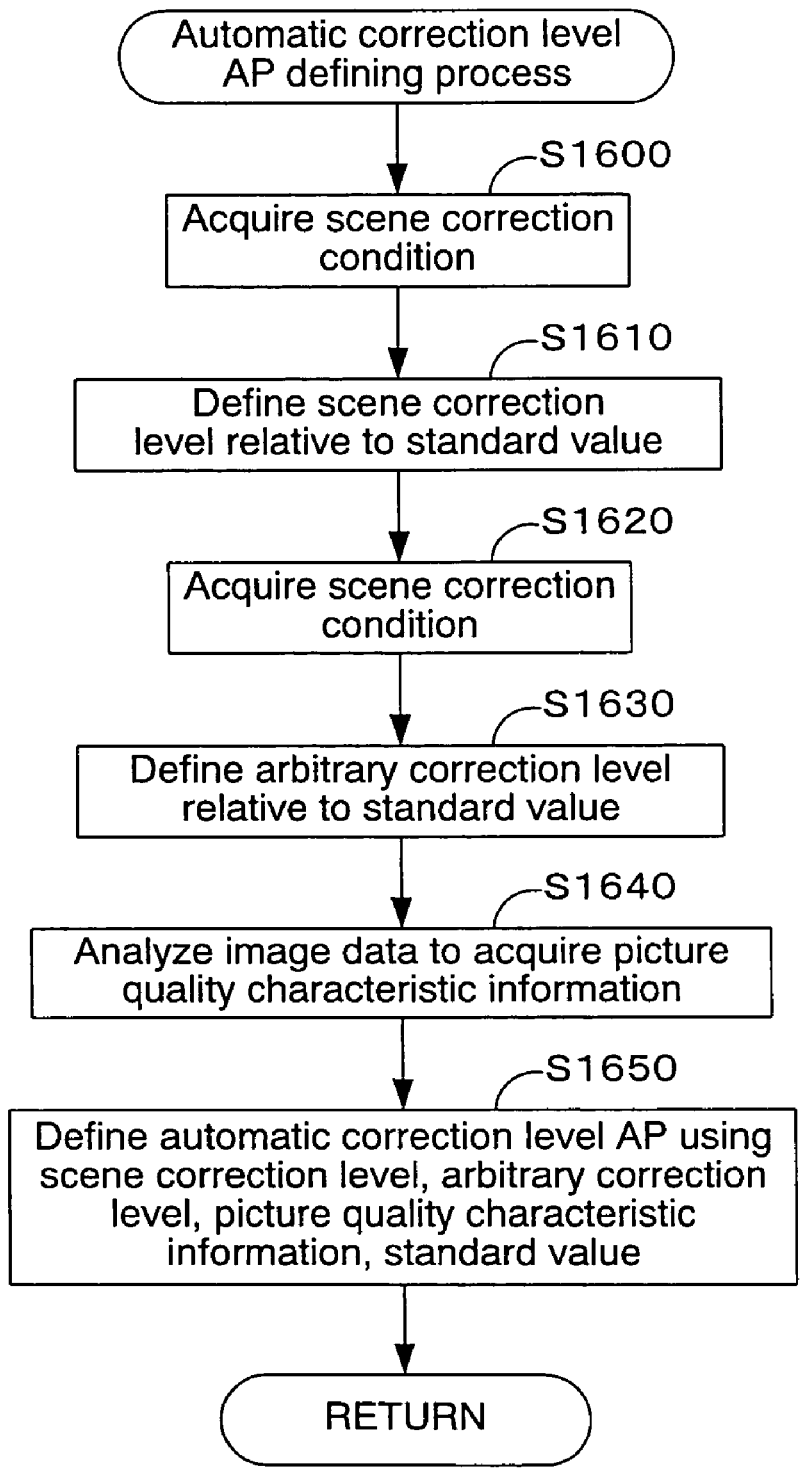
FIG. 9 is a flowchart showing the process routine for the automatic correction level AP setting process executed in the flowchart of FIG. 4.

The following description of image processing executed by thee image processing apparatus of the embodiment makes reference to FIGS. 4-9. FIG. 4 is a flowchart showing the process routine of image processing executed by thee image processing apparatus of the embodiment. FIG. 5 is a flowchart showing the process routine for the color space setting process executed in the flowchart of FIG. 4. FIG. 6 is a flowchart showing the process routine for the scene correction condition setting process executed in the flowchart of FIG. 4. FIG. 7 is a flowchart showing the process routine for the arbitrary correction condition setting process executed in the flowchart of FIG. 4. FIG. 8 is a flowchart showing the process routine for the manual correction condition setting process executed in the flowchart of FIG. 4. FIG. 9 is a flowchart showing the process routine for the automatic correction level AP setting process executed in the flowchart of FIG. 4.

Image processing performed in the embodiment may initiate, for example, when a memory card MC is installed in personal computer PC, or when DSC 30 is connected to personal computer PC via a communications cable; or may be executed in response to a image processing instruction input by the user from the keyboard or other input device.

When image processing initiates, personal computer PC (CPU 100) acquires image data and temporarily places it in RAM 103 (Step S100). CPU 100 ascertains from the header of the image data whether the exceptional processing flag is set to "1" (Step S110), and in the event it determines that the exceptional processing flag equals "1" (Step S110: Yes), proceeds to Step S180, without executing a correction process on the image data.

If CPU 100 determines that the exceptional processing flag is not set to "1" (exceptional processing flag="0") (Step S110: No), it executes a color space setting process (Step S120).

The following specific description of the color space setting process refers to FIG. 5. CPU 100 searches the image data header for color space information (Step S1200). As noted, since shooting information SI does not describe color space information, the search is directed to a tag in the image processing control information GI. CPU 100 searches the image processing control information GI, and in the event it determines that color space information is described (Step S1210: Yes), it defines the color space described in the color space information of the image processing control information GI as the working color space, executes a color conversion process (Step S1220), and returns to the main routine. The color space described in the color space information may include, for example, the wRGB color space, which has a wider gamut than the NTSC color space or the sRGB [color space]. However, since in most instances image data from DSC 30 is YCbCr data, each matrix value of the matrix used for YCbCr-wRGB color conversion operations is described by way of color space information. Accordingly, a process of YCbCr-wRGB color conversion, for example, is executed in the color conversion process.

In the event that CPU searches the image processing control information GI but determines that no color space information is described, or in the event that it cannot search for color space information (Step S1210: No), the working color space is set to the sRGB color space typically used by PC computers, executes a YCbCr-sRGB color conversion process (Step S1230), and returns to the main routine.

Referring back to FIG. 4, CPU 100 executes a scene correction condition setting process (Step S130). The following specific description of the scene correction condition setting process refers to FIG. 6. In the scene correction condition setting process, there is defined a scene correction condition constituting one parameter used for defining the automatic correction level AP. CPU 100 initiates a search for scene information in the header of the image data (Step S1300). CPU 100 determines whether scene information (shooting scene) is described in the shooting information SI (Step S1310), and in the event it determines that a shooting scene is described (Step S1310: Yes), defines the described shooting scene as the scene correction condition for defining automatic correction level AP (Step S1320).

In the event of CPU 100 determining that a shooting scene is not described (Step S1310: No), it determines that shooting information SI does not describe scene information, and proceeds to Step S1330.

CPU 100 then determines whether scene information is described in the image processing control information GI (S1330), and in the event it determines that a scene-specific image processing parameter is described (Step SI330: Yes), it overwrites [any previous setting] and defines the described scene-specific image processing parameter as the scene correction condition that defines automatic correction level AP (Step S1340), then returns to the main routine. That is, where shooting information SI contains a description of scene information, the scene correction condition is updated with the scene-specific image processing parameter in image processing control information GI; or where shooting information SI does not contain a description of scene information, the scene-specific image processing parameter in image processing control information GI is made the initial setting for the scene correction condition. For example, where shooting information SI describes a "Standard" shooting scene, but the scene-specific image processing parameter in image processing control information GI describes "Sunset", "Sunset" will be employed as the scene correction condition.

In the event of CPU 100 determining that a scene-specific image processing parameter is not described (Step S1330: No), it determines that the image processing control information GI does not describe a scene-specific image processing parameter, and returns to the main routine. Specifically, where shooting information SI contains a description of scene information, a scene correction condition based on the shooting information SI is employed; or where shooting information SI does not contain a description of scene information, no scene correction condition is defined.

Referring back to FIG. 4, CPU 100 executes an arbitrary correction condition setting process (Step S140). The following specific description of the arbitrary correction condition setting process refers to FIG. 7. In the arbitrary correction condition setting process, there is defined an arbitrary correction condition constituting one parameter used for defining the automatic correction level AP. [These correction conditions] differ in that, whereas the scene correction condition is intended to define, on a shooting scene unit basis, suitable correction conditions for a plurality of parameters, the arbitrary correction condition is intended to define, on an individual basis, a suitable correction condition for an individual parameter.

CPU 100 initiates a search for arbitrary correction information in the header of the image data (Step S1400). CPU 100 determines whether arbitrary correction information (contrast, etc.) is described in the shooting information SI (Step S1410), and in the event it determines that arbitrary correction information is described (Step S1410: Yes), defines the described arbitrary correction information as the arbitrary correction condition for defining automatic picture quality adjustment parameter AP (Step S1420). Specifically, a parameter from among, for example, contrast, saturation, and sharpness, described as arbitrary correction information in the shooting information SI, is defined as the arbitrary correction condition.

In the event of CPU 100 determining that arbitrary correction information is not described (Step S1410: No), it determines that shooting information SI does not describe arbitrary correction information, and proceeds to Step S1430.

CPU 100 then determines whether arbitrary correction information (a contrast specifying parameter, etc.) is described in the image processing control information GI (S1430), and in the event it determines that arbitrary correction information is described (Step S1430: Yes), it overwrites [any previous setting] and defines the described arbitrary correction information as the arbitrary correction condition for defining automatic picture quality adjustment parameter AP (Step S1440), then returns to the main routine. That is, from among, for example, a contrast specifying parameter, a saturation specifying parameter, and a sharpness specifying parameter, a specifying parameter described in the image processing control information GI is defined as the arbitrary correction condition. Where shooting information SI contains a description of arbitrary correction information, the arbitrary correction condition is updated with arbitrary correction information from the image processing control information GI; or where shooting information SI does not contain a description of arbitrary correction information, the arbitrary correction information from the image processing control information GI is made the initial setting for the arbitrary correction condition. For example, where shooting information SI describes "Contrast: Weak, Saturation: Standard", but the image processing control information GI describes "Contrast specifying parameter: Standard, Saturation:—", for the Contrast parameter, the "Standard" setting given in the image processing control information GI will be used; whereas for the Saturation parameter, the "Standard" setting given in the shooting information SI will be used, since the image processing control information GI does not contain a description.

In the event of CPU 100 determining that arbitrary correction information is not described (Step S1430: No), it determines that the image processing control information GI does not describe arbitrary correction information, and returns to the main routine. Specifically, where shooting information SI contains a description of arbitrary correction information, an arbitrary correction condition based on the shooting information SI is employed; or where shooting information SI does not contain a description of arbitrary correction information, no arbitrary correction condition is defined.

Referring back to FIG. 4, CPU 100 executes a manual correction setting process (Step S150). The following specific description of the manual correction setting process refers to FIG. 8. CPU 100 initiates a search for manual correction information in the header of the image data (Step S1500). Since, as noted, the shooting information SI does not describe manual correction information, the search is directed to a tag in the image processing control information GI. CPU 100 searches the image processing control information GI, and in the event it determines that manual correction information is described (Step S1510: Yes), defines the manual correction level MP as the value of each parameter described in the manual correction information of image processing control information GI (Step S1520), then returns to the main routine. Parameters described in manual correction information may include, for example, the parameters of contrast, saturation, and brightness; values of these parameters are not employed in picture quality adjustment processing using standard values (automatic picture quality adjustment processing), but rather employed directly as picture quality correction levels for image data.

In the event that CPU 100 searches the image processing control information GI and determines that no manual correction information is described, or in the event that it cannot search the image processing control information GI (Step S1510: No), it returns to the main routine without defining manual correction information.

Referring back to FIG. 4, CPU 100 executes an automatic correction level AP setting process (Step S160). The following specific description of the automatic correction level AP setting process refers to FIG. 9. CPU 100 acquires the scene correction condition defined previously (Step S1600), and on the basis of the description of the scene correction condition, defines a scene correction level, with respect to a standard value, for each parameter relating to picture quality (S1610). For image processing control information GI, the scene correction level relative to a standard value may describe, for example, a correction trend (correction level with respect to a standard value) for each parameter on a scene-by-scene basis by way of a scene-specific image processing parameter; or describe a value indicating a scene by way of a scene-specific image processing parameter. In the case of shooting information SI, it will correspond to the latter, since only information indicating shooting scene is described.

CPU 100 acquires an arbitrary correction condition (Step S1620), and on the basis of the arbitrary correction condition defines an arbitrary correction level, with respect to a standard value, for each parameter relating to picture quality (S1630). The arbitrary correction level with respect to a standard value may describe, for example, a correction trend (correction level with respect to a standard value) for an arbitrary parameter by way of image processing control information GI or shooting information SI; or where a value indicating arbitrary correction level is described, the correction level for each parameter may be read out from a reference table pre-stored in ROM 101 or HDD 102.

CPU 100 analyzes the image data and acquires picture quality characteristic information (picture quality characteristic value) (Step S1640). Picture quality characteristic values include, for example, statistical values (histograms) for the R, G, and B components, and luminance. CPU 100 calculates deviation (difference) between picture quality characteristic value and standard value for each parameter, and applies a scene correction level and arbitrary correction level to deviation thusly calculated to define an automatic correction level AP (Step S1650), then returns to the main routine. For example, in the event that in image processing control information GI, "Landscape" is described as a scene-specific image processing parameter, but not described in the contrast-specifying parameter, and in the shooting information SI, "Standard" is described as the shooting scene, and contrast is described as "Weak", as contrast is somewhat high in "Landscape" [mode], contrast is adjusted from the higher end towards the lower end.

Referring back to FIG. 4, CPU 100 executes a picture quality adjustment process on the image data, using the automatic correction level AP and manual correction level MP defined previously (Step S170). In this picture quality adjustment process, parameter values of the image data are modified (corrected) by means of the automatic correction level AP and manual correction level MP. CPU 100 sends the processed image data to the printer driver (Step S180), and terminates the processing routine. The printer driver executes processes such as RGB-CMYK color conversion using a lookup table or the like, halftoning, and so on, and outputs the image data in the form of raster data to printer 20.

According to the image processing apparatus of the embodiment described hereinabove, image processing (picture quality adjustment) of image data can be carried out through effective use of both shooting information SI and image processing control information GI associated with the image data. Since preference is normally given to image processing control information GI, which has been defined to reflect the result of image output by an image output device of image data generated by an image data generating device, and which specifies image processing conditions to be used during image processing, it is possible to produce an output result that reflects shooting conditions, the photographer's intent, and DSC/printer matchup.

Even where image processing control information GI lacks useable parameters, since it is possible to use shooting information SI which is normally appended to image data created by a DSC 30, image processing appropriate to shooting conditions may be carried out under a wider range of conditions.

OTHER EMBODIMENTS

In the embodiment described above, image processing was carried out using a personal computer PC as the image processing apparatus, but instead a standalone printer equipped with a image processing function could be used as the image processing apparatus, in which case the image processing described above would be performed by the printer. Embodiment in the form of a printer driver or image processing application (program) without any accompanying hardware arrangement, such as a image processing apparatus, is also possible.

While the embodiment described an example of shooting information SI and image processing control information GI being described in the image data header, the SI and GI information could instead be provided as another data file associated with image data on a one-to-one basis.

While not discussed in the embodiment, when performing YCbCr-sRGB/wRGB color conversion, or when performing wRGB-sRGB color conversion, gamma correction and inverse gamma correction may be performed as well.

In the embodiment, image processing control information GI was always given preference in handling, but it would be possible instead to enable the user to select whether image processing is performed using image processing control information GI or shooting information SI. This enables image processing to be carried out according to user preference.

While a image processing apparatus, image processing method, and computer program product containing image processing program instructions, pertaining to the invention have been shown and described through an embodiment, the embodiments of the invention described hereinabove are intended merely as an aid in understanding the invention, and should not be construed as limiting thereof. Various modifications and improvements to the invention are possible within the spirit and scope of the invention, and the invention will naturally include such equivalents.

What is claimed is:

1. An image processing method for executing image processing of image data generated by an image data generating apparatus, said method comprising:
    acquiring shooting information that indicates shooting conditions at the time of shooting, said shooting information describing a plurality of shooting condition parameters;
    acquiring image processing control information that designates a plurality of picture quality adjustment parameters to be used during image processing in an image processing apparatus, said image processing control information describing a plurality of specifying parameters, and said image processing control information designating image processing conditions to be used in said image processing apparatus, said image data generating apparatus being separate from said image processing apparatus;
    setting said plurality of picture quality adjustment parameters on the basis of said plurality of specifying parameters, while for any of said plurality of picture quality adjustment parameters that is not set by means of said specifying parameters, setting these said picture quality adjustment parameters on the basis of said shooting condition parameters; and
    executing image processing of said image data in said image processing apparatus using said set picture quality adjustment parameters.

2. An image processing method according to claim 1 wherein said plurality of specifying parameters include parameters that make up particular combinations of specifying parameters appropriate to particular shooting scenes, for designating image processing depending on the shooting scene;
    and wherein said shooting condition parameters include scene-specific shooting condition parameters describing a particular shooting scene set at the time of shooting.

3. An image processing method according to claim 1 or 2 wherein image processing of said image data comprises:
    analyzing said image data to extract characteristic parameters that indicate picture quality characteristics of image data;
    acquiring a plurality of standard parameters predetermined for said plurality of picture quality adjustment parameters and serving as targets in picture quality adjustment; and
    adjusting picture quality of said image data by eliminating or reducing any deviation between each value of said characteristic parameters and each value of said acquired standard picture quality parameters with reflecting said plurality of picture quality adjustment parameters.

4. An image processing method for executing image processing of image data that has been generated by an image data generating apparatus and that has been associated with at least one set of information selected from shooting information indicating shooting conditions at the time of shooting, and image processing control information designating a plurality of picture quality adjustment parameters to be used during image processing in an image processing apparatus that is separate from said image data generating apparatus, said method comprising:

acquiring said image data;

searching, from among the image processing control information associated with said image data, for a scene-specific image processing condition parameter depending on a particular shooting scene, the image processing control information designating image processing conditions to be used in said image processing apparatus;

in the event that said scene-specific image processing condition parameter is not found, searching, from among the shooting conditions associated with said image data, for a shooting scene condition;

searching, from among the image processing control information associated with said image data, for an arbitrary image processing designating condition that arbitrarily designates an image processing condition;

in the event that said arbitrary image processing designating condition is not found, searching, from among the shooting conditions associated with said image data, for an arbitrarily set shooting condition; and acquiring each said searched for condition, and executing image processing of said image data in said image processing apparatus using said acquired conditions.

5. An image processing method according to claim 4 wherein image processing of said image data comprises:

analyzing said image data to extract characteristic parameters that indicate picture quality characteristics of image data;

acquiring a plurality of standard parameters serving as targets in picture quality adjustment; and adjusting picture quality of said image data by eliminating or reducing any deviation between each value of said characteristic parameters and each value of said acquired standard picture quality parameters with reflecting said plurality acquired.

6. An image processing method for executing image processing of image data that has been generated by an image data generating apparatus and that has been associated with at least one set of information selected from shooting information that indicates shooting conditions at the time of shooting, and image processing control information that designates a plurality of picture quality adjustment parameters to be used during image processing in an image processing apparatus that is separate from said image data generating apparatus, said method comprising:

acquiring shooting scene information from said shooting conditions;

defining scene correction information on the basis of said acquired shooting scene information;

searching among said image processing control information for a scene-specific image processing condition that designates an image processing condition on a scene-specific basis, said image processing control information designating image processing conditions to be used in said image processing apparatus;

in the event that said scene-specific image processing condition is found among said image processing control information, replacing said scene correction information with said scene-specific image processing condition;

acquiring arbitrary correction information from said shooting conditions;

defining image arbitrary correction information on the basis of the acquired said arbitrary correction information;

searching among said image processing control information for an arbitrary image processing condition designating an arbitrarily selected image processing condition;

in the event that said arbitrary image processing condition is found among said image processing control information, replacing said image arbitrary correction information with said arbitrary image processing condition; and executing image processing of said image data in said image processing apparatus on the basis of said scene correction condition and said image arbitrary correction information.

7. An image processing method according to claim 6 wherein image processing of said image data comprises:

analyzing said image data to extract characteristic parameters that indicate picture quality characteristics of image data;

acquiring a plurality of standard parameters serving as targets in picture quality adjustment; and adjusting picture quality of said image data by eliminating or reducing any deviation between each value of said characteristic parameters and each value of said acquired standard picture quality parameters with reflecting said scene correction condition and said image arbitrary correction information.

8. An image processing method for executing image processing of image data that has been associated with at least one set of information selected from shooting information that indicates shooting conditions at the time of shooting, and image processing control information that designates a plurality of picture quality adjustment parameters to be used during image processing, said image data being associated with the at least one set of information selected from said shooting information and said image processing control information by an image data generating apparatus, said method comprising:

selecting either said shooting information or said image processing control information;

acquiring as information either said selected shooting information or said image processing control information; and executing picture quality adjustment processing of said image data in an image processing apparatus using said acquired information, said image data generating apparatus and said image processing apparatus being separate bodies.

9. An image processing apparatus for executing image processing of image data generated by an image data generating apparatus that is separate from said image processing apparatus, said image processing apparatus comprising:

shooting information acquisition logic for acquiring shooting information that indicates shooting conditions at the time of shooting, said shooting information describing a plurality of shooting condition parameters;

image processing control information acquisition logic for acquiring image processing control information that designates a plurality of picture quality adjustment parameters to be used during image processing, said image processing control information describing a plurality of specifying parameters, and said image processing control information designating image processing conditions to be used in said image processing apparatus;

picture quality adjustment parameter setting logic for setting said plurality of picture quality adjustment parameters on the basis of said plurality of specifying parameters, while for any of said plurality of picture quality adjustment parameters that is not set by means of said specifying parameters, setting these said picture quality adjustment parameters on the basis of said shooting condition parameters; and image processing logic for executing image processing of said image data using said set picture quality adjustment parameters.

10. An image processing apparatus for executing image processing of image data that has been generated by an image data generating apparatus and that has been associated with at least one set of information selected from shooting information indicating shooting conditions at the time of shooting, and image processing control information designating a plurality of picture quality adjustment parameters to be used during image processing, said image processing control information designating image processing conditions to be used in said image processing apparatus, said image data generating apparatus being separate from said image processing apparatus, said image processing apparatus comprising:

image data acquisition logic for acquiring said image data;

first search logic for searching, from among the image processing conditions associated with said image data, for a scene-specific image processing condition parameter depending on a particular shooting scene, and in the event that said scene-specific image processing condition parameter is not found, searching, from among the shooting conditions associated with said image data, for a shooting scene condition;

second search logic for searching, from among the image processing conditions associated with said image data, for an arbitrary image processing designating condition that arbitrarily designates an image processing condition, and in the event that a said arbitrary image processing designating condition is not found, searching, from among the shooting conditions associated with said image data, for an arbitrarily set shooting condition; and image processing logic for executing image processing of said image data using conditions acquired by each said search logic.

11. An image processing apparatus for executing image processing of image data that has been generated by an image data generating apparatus and that has been associated with at least one set of information selected from shooting information that indicates shooting conditions at the time of shooting, and image processing control information that designates a plurality of picture quality adjustment parameters to be used during image processing, said image processing control information designating image processing conditions to be used in said image processing apparatus, said image data generating apparatus being separate from said image processing apparatus, said image processing apparatus comprising:

scene information acquisition logic for acquiring shooting scene information from said shooting conditions, and defining scene correction information;

first search logic for searching among said image processing conditions for a scene-specific image processing condition that designates an image processing condition on a scene-specific basis;

scene correction information update logic that, in the event that said scene-specific image processing condition is found among said image processing conditions, replaces said scene correction information with said scene-specific image processing condition;

arbitrary correction information acquisition logic for acquiring arbitrary correction information from said shooting conditions, and defining image arbitrary correction information;

second search logic for searching among said image processing conditions for an arbitrary image processing condition designating an arbitrarily selected image processing condition;

image arbitrary correction information update logic that, in the event that said arbitrary image processing condition is found among said image processing conditions, replaces said image arbitrary correction information with said arbitrary image processing condition; and picture quality adjustment logic for executing image processing of said image data on the basis of said scene correction condition and said image arbitrary correction information.

12. An image processing apparatus for executing image processing of image data that has been associated with at least one set of information selected from shooting information that indicates shooting conditions at the time of shooting, and image processing control information that designates a plurality of picture quality adjustment parameters to be used during image processing, said image data being associated with the at least one set of information selected from said shooting information and said image processing control information by an image data generating apparatus, said image processing apparatus comprising:

selection logic for selecting either said shooting information or said image processing control information;

information acquisition logic for acquiring as information either said selected shooting information or said image processing control information; and image processing logic for executing picture quality adjustment processing of said image data in said image processing apparatus using said acquired information, said image data generating apparatus and said image processing apparatus being separate bodies.

13. A computer program product including a computer-readable storage medium having stored thereon computer-executable image processing program instructions for executing image processing of image data generated by an image data generating apparatus, said computer program product comprising:

a program instruction for acquiring shooting information that indicates shooting conditions at the time of shooting, said shooting information describing a plurality of shooting condition parameters;

a program instruction for acquiring image processing control information that designates a plurality of picture quality adjustment parameters to be used during image processing in an image processing apparatus, said image processing control information describing a plurality of specifying parameters, and said image processing control information designating image processing conditions to be used in said image processing apparatus, said image data generating apparatus being separate from said image processing apparatus;

a program instruction for setting said plurality of picture quality adjustment parameters on the basis of said plurality of specifying parameters, while for any of said plurality of picture quality adjustment parameters that is not set by means of said specifying parameters, setting these said picture quality adjustment parameters on the basis of said shooting condition parameters; and a program instruction for executing image processing of said image data using said set picture quality adjustment parameters.

14. A computer program product including a computer-readable storage medium having stored thereon computer-executable image processing program instructions for executing image processing of image data that has been generated by an image data generating apparatus and that has been associated with at least one set of information selected from shooting information that indicates shooting conditions at the time of shooting, and image processing control information that designates a plurality of picture quality adjustment parameters to be used during image processing in an image processing apparatus that is separate from said image data generating apparatus, said computer program product comprising:

a program instruction for acquiring said image data;

a program instruction for searching, from among the image processing control information associated with said image data, for a scene-specific image processing condition parameter depending on a particular shooting scene, the image processing control information designating image processing conditions to be used in said image processing apparatus;

a program instruction that, in the event that said scene-specific image processing condition parameter is not found, searches, from among the shooting conditions associated with said image data, for a shooting scene condition;

a program instruction for searching, from among the image processing conditions associated with said image data, for an arbitrary image processing designating condition that arbitrarily designates an image processing condition;

a program instruction that, in the event that said arbitrary image processing designating condition is not found, searches, from among the shooting conditions associated with said image data, for an arbitrarily set shooting condition; and a program instruction for acquiring each said searched for condition, and executing image processing of said image data in said image processing apparatus using said acquired conditions.

15. A computer program product including a computer-readable storage medium having stored thereon computer-executable image processing program instructions for executing image processing of image data that has been generated by an image data generating apparatus and that has been associated with at least one set of information selected from shooting information that indicates shooting conditions at the time of shooting, and image processing control information that designates a plurality of picture quality adjustment parameters to be used during image processing in an image processing apparatus that is separate from said image data generating apparatus, said computer program product comprising:

a program instruction for acquiring shooting scene information from said shooting conditions;

a program instruction for defining scene correction information on the basis of said acquired shooting scene information;

a program instruction for searching among said image processing control information for a scene-specific image processing condition that designates an image processing condition on a scene-specific basis, said image processing control information designating image processing conditions to be used in said image processing apparatus;

a program instruction that, in the event that said scene-specific image processing condition is found among said image processing control information, replaces said scene correction information with said scene-specific image processing condition;

a program instruction for acquiring arbitrary correction information from said shooting conditions;

a program instruction for defining image arbitrary correction information on the basis of the acquired said arbitrary correction information;

a program instruction for searching among said image processing control information for an arbitrary image processing condition designating an arbitrarily selected image processing condition;

a program instruction that, in the event that said arbitrary image processing condition is found among said image processing control information, replaces said image arbitrary correction information with said arbitrary image processing condition; and a program instruction for executing image processing of said image data in said image processing apparatus on the basis of said scene correction condition and said image arbitrary correction information.

* * * * *